(12) United States Patent
Jacomb-Hood

(10) Patent No.: US 7,369,085 B1
(45) Date of Patent: May 6, 2008

(54) SHARED PHASED ARRAY BEAMFORMER

(75) Inventor: Anthony W. Jacomb-Hood, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/651,028

(22) Filed: Jan. 9, 2007

Related U.S. Application Data

(62) Division of application No. 11/117,381, filed on Apr. 29, 2005, now Pat. No. 7,180,447.

(51) Int. Cl.
 *H01Q 3/24* (2006.01)
(52) U.S. Cl. .................................. 342/374; 342/372
(58) Field of Classification Search ................ 342/368, 342/372, 374; 455/277.1
See application file for complete search history.

(56) References Cited

U.S. PATENT DOCUMENTS

| | | | | |
|---|---|---|---|---|
| 4,815,479 | A | * | 3/1989 | Carr ........................... 607/102 |
| 4,929,956 | A | * | 5/1990 | Lee et al. .................... 342/376 |
| 5,029,306 | A | * | 7/1991 | Bull et al. ................... 342/368 |
| 5,117,239 | A | | 5/1992 | Riza |
| 5,294,934 | A | * | 3/1994 | Matsumoto ................. 342/173 |
| 5,621,752 | A | | 4/1997 | Antonio et al. |
| 5,955,991 | A | | 9/1999 | Kawakubo |
| 6,043,776 | A | | 3/2000 | Chiba et al. |
| 6,522,643 | B1 | | 2/2003 | Jacomb-Hood et al. |
| 6,703,976 | B2 | | 3/2004 | Jacomb-Hood |
| 6,738,017 | B2 | | 5/2004 | Jacomb-Hood |
| 6,747,595 | B2 | | 6/2004 | Jirabe |
| 6,859,168 | B2 | | 2/2005 | Isaji |
| 2004/0196203 | A1 | | 10/2004 | Lier et al. |
| 2005/0012655 | A1 | * | 1/2005 | Lalezari et al. ............. 342/62 |

FOREIGN PATENT DOCUMENTS

| | | |
|---|---|---|
| EP | 03749484.6 | 9/2003 |
| WO | WO/US02/024324 | 8/2002 |
| WO | WO/US02/035089 | 11/2002 |
| WO | WO/US03/023172 | 7/2003 |
| WO | WO/US03/027848 | 9/2003 |
| WO | WO/US03/027973 | 9/2003 |
| WO | WO/US03/028641 | 9/2003 |
| WO | WO 2004/025774 | 3/2004 |

OTHER PUBLICATIONS

U.S. Appl. No. 10/952,788, filed Sep. 30, 2004.
U.S. Appl. No. 09/921,130, filed Aug. 3, 2001.
U.S. Appl. No. 10/442,015, filed May 19, 2003.
U.S. Appl. No. 10/660,410, filed Sep. 10, 2003.
U.S. Appl. No. 10/816,693, filed Apr. 1, 2004.

* cited by examiner

*Primary Examiner*—Dao Phan
(74) *Attorney, Agent, or Firm*—McDermott Will & Emery LLP

(57) ABSTRACT

A shared beamformer flexibly allocates beams among phased array antenna apertures of a satellite (or other type of platform). By sharing the beamformer among the apertures, if one aperture is not providing useful coverage (due to orientation, traffic volume, signal frequency, signal polarization, etc.), the beams may be reallocated to one or more other apertures that are providing useful coverage. To share the beamformer among the phased array antenna apertures, a selector network (e.g., one or more switches) is used to select which particular apertures are to send or receive signals.

4 Claims, 7 Drawing Sheets

L = Number of phased array antenna apertures
M = Antenna elements per phased array antenna aperture
N = Maximum number of beams
P = Number of Beams per phased array antenna aperture

| Component | Number of Components in Conventional Beamformer (216) | Number of Components in Shared Beamformer (218) | Number of Components Eliminated (220) | Number of Components Added (222) |
|---|---|---|---|---|
| Total Antenna Elements | LM | LM | 0 | 0 |
| N/P-way Power Dividers | LM | LM | 0 | 0 |
| L-way Selectors | 0 | MN/P | 0 | MN/P |
| P-way Power Dividers | LMN/P | MN/P | (L-1)MN/P | 0 |
| Phase Shifter / Attenuator | LMN | MN | (L-1)MN | 0 |
| M-way Combiner | LN | N | (L-1)N | 0 |

Table 214

FIG. 7

SHARED PHASED ARRAY BEAMFORMER

CROSS-REFERENCE TO RELATED APPLICATION

This is a divisional application of U.S. patent application Ser. No. 11/117,381, filed Apr. 29, 2005, now U.S. Pat. No. 7,180,447 which is hereby incorporated herein by reference in its entirety for all purposes.

TECHNICAL FIELD

This disclosure relates to phased array antenna systems and, more particularly, to beamformers for phased array antenna systems.

BACKGROUND

With the advances in wireless technology, satellites such as low earth orbit satellites are used in telecommunication systems to establish communication links across large distances. To produce these links, phased array antennas have been incorporated into some satellites as well as mobile and stationary ground stations. A phased array antenna has an aperture that is assembled from a large number of radiating elements, such as slots or dipoles. By individually controlling a phase shift and attenuation that is applied to each element, predictable beams may be formed and accurately pointed in particular directions. The aperture is assigned a fixed number of beams and each beam may be pointed in a direction to establish a communication link. For example, a multi-aperture satellite may include four phased array antenna apertures and twelve beams are assigned to each aperture (for a total of forty-eight beams associated with the satellite). Thus, each of the phased array antenna apertures may point its twelve beams in various directions to establish links. However, during particular times and at particular locations in the satellite's orbit, one or more of the apertures may be positioned in such an orientation as to not provide useful coverage. Similarly, one or more the apertures may operate with different frequencies and/or polarizations. Due to these different electromagnetic operating characteristics, useful coverage may also not be provided at all times. Due to these periods of poor coverage, the beams assigned to one or more of the phased array apertures are wasted since they can not establish communication links.

SUMMARY OF THE DISCLOSURE

The subject matter disclosed herein solves these problems by providing a beamformer that flexibly allocates beams among phased array antenna apertures of a satellite (or other type of platform). By sharing the beamformer among the apertures, if one aperture is not providing useful coverage (due to orientation, light traffic volume, signal frequency, signal polarization, etc.), the beams may be reallocated to one or more other apertures that are providing useful coverage. To share the beamformer among the phased array antenna apertures, a selector network (e.g., one or more switches) is used to select which particular apertures are to send or receive signals.

In accordance with an aspect of the disclosure, a phased array antenna system includes two or more phased array antenna elements that are configured to receive electromagnetic signals. A selector included in the phased array antenna system is configured to provide an electromagnetic signal received by one of the phased array antenna elements to a signal combiner that combines electromagnetic signals to produce an antenna beam.

In one embodiment, the two or more phased array antenna elements may be located in the same phased array antenna or in different phased array antennas. The phased array antenna system may include a phase shifter that receives a signal from the selector, adjusts the phase of the received signal, and provides the adjusted signal to the combiner. The selector may include a switch such as a two-way switch. The selector may include various types of switches such as a semiconductor switch, a mechanical switch, a ferrite switch, or an optical switch. Portions of the phased array antenna system may be integrated into a single package. For example, the selector may be integrated with a power divider and an attenuator into an integrated package.

In accordance with another aspect of the disclosure, a phased array antenna system includes two or more phased array antenna elements that are configured to transmit electromagnetic signals, and a selector that is configured to provide an electromagnetic signal from a signal divider to one of the phased array antenna elements.

In one embodiment, the two or more phased array antenna elements may be located on the same or separate phased array antennas. The selector may include one or more switches and various types of switches. The phased array antenna system may further include a phase shifter that may shift the phase of the electromagnetic signal provided by the signal divider.

In accordance with another aspect of the disclosure, a method of producing electromagnetic beams includes receiving electromagnetic signals at two or more phased array antenna elements, and providing the electromagnetic signal received at one of the phased array antenna elements to a signal combiner to produce an antenna beam.

In one embodiment, providing the electromagnetic signal to the signal combiner may include selecting to connect one of the phased array antenna elements to the signal combiner.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

BRIEF DESCRIPTION OF THE DRAWINGS

FIG. 7 presents a table that compares the hardware components needed to implement a phased array antenna system with dedicated beamformers and the hardware components needed to implement a phased array antenna system that shares beamformers.

DETAILED DESCRIPTION OF THE EMBODIMENTS

Figure 1:
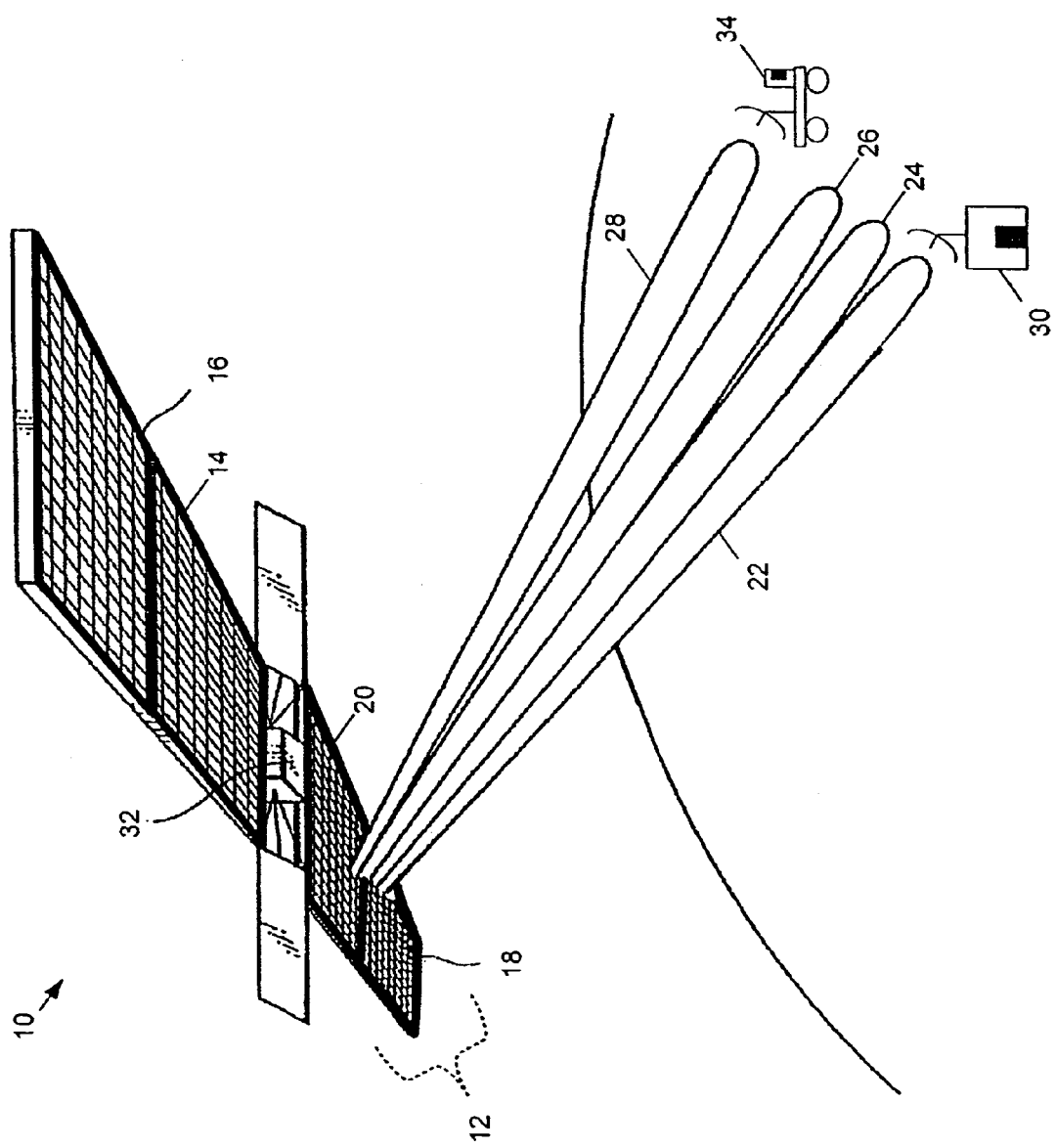
FIG. 1 is a diagrammatic view of a satellite that includes a phased array antenna system that is configured to produce multiple transmission and/or reception beams.

Referring to FIG. 1, a satellite 10 is shown in orbit and includes a phased array antenna system 12 that is capable of producing multiple beams. Phased array antenna system 12 includes four apertures 14, 16, 18 and 20. In this representation, apertures 14 and 16 are shown producing four distinct beams 22, 24, 26, and 28. Each of these beams may be used for transmitting and/or receiving electromagnetic signals to and from locations respectively covered by phased array antenna system 12. For example, beam 22 may be used to receive an electromagnetic signal (e.g., a radio frequency (RF) signal, etc.) that is transmitted from a ground station 30 that is covered by beam 22. To receive the electromagnetic signal on beam 22, phased array antenna system 12 or a portion of the phased array antenna system (e.g., aperture 18) is designed to operate at one or more frequencies (e.g., C-band, Ku-band, etc.) within the electromagnetic spectrum in which ground station 30 transmits. Additionally, phased array antenna system 12 may be designed to receive electromagnetic signals with one or more polarizations. For example, phased array antenna system 12 or a portion of the phased array antenna system (e.g., aperture 18) may be designed to operate with polarizations such as linear polarizations (e.g., vertical, horizontal, etc.), circular polarization (e.g., right hand circular, left hand circular, etc.), elliptical polarization, or other similar electromagnetic polarization.

Continuing with the example, after receiving the electromagnetic signal over beam 22, the signal may be processed (e.g., amplified, placed in another frequency band, etc.) by hardware onboard satellite 10. For example, a C-band, vertically polarized signal may be received from ground station 30 over beam 22. Once received, circuitry in a payload module 32 (and/or circuitry located near one or more of the radiating elements) may process the signal for transmission to another location that is covered by satellite 10. For example, the signal may be amplified, mixed to a frequency within the Ku-band, and transmitted with a horizontal polarization. In this scenario, the processed signal is transmitted over beam 28 to a mobile station 34 (e.g., a car, a truck, etc.).

Figure 2:
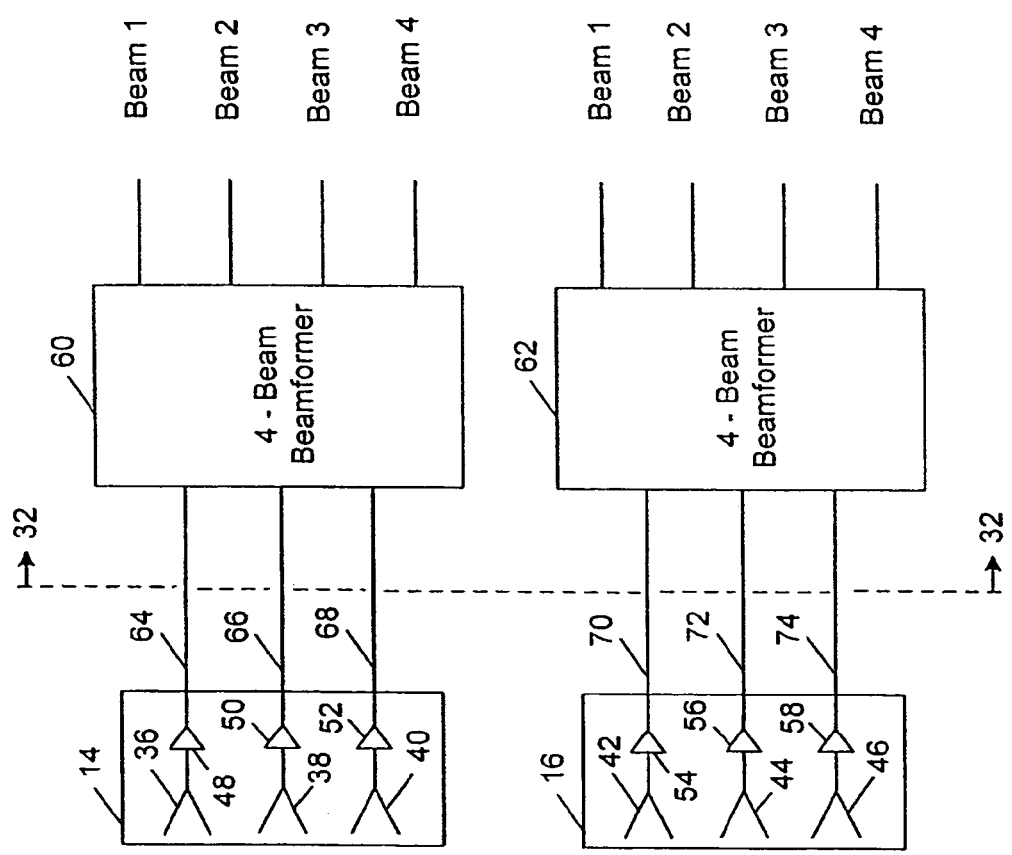
FIG. 2 is a diagrammatic view of dedicated phased array beamformers for two apertures included in the phased array antenna system shown in FIG. 1.

Referring to FIG. 2, a block diagram representing a portion of payload module 32 and apertures 14 and 16 are shown. Each aperture includes a number of antenna elements that in aggregate form each aperture. For illustrative purposes, only three elements are shown in aperture 14 and aperture 16. In particular, aperture 14 includes antenna elements 36, 38 and 40 while aperture 16 includes antenna elements 42, 44 and 46. In this example, both apertures 14 and 16 are configured to receive electromagnetic signals. However, typically platforms such as satellite 10 include phased array antennas for transmitting and receiving. For example, one phased array antenna is configured to transmit at a particular frequency band (e.g., Ku, Ka, etc.) and polarization (e.g., linear polarization, etc.) and a complementary phased array antenna is configured to receive at a different frequency and orthogonal polarization. Each of the antenna elements (e.g., elements 36-46) may be implemented with identical or dissimilar antenna designs (e.g., dipoles, patches, helices, etc.) that are well known to a person of skill in the art of antenna design and antenna system design. Each antenna element 36-46 is respectively connected to a low noise amplifier 48, 50, 52, 54, 56, 58 that conditions the received signal prior to providing it to payload module 32.

In this example payload module 32 includes two conventional four-beam beamformers 60, 62 that each produce four beams from the electromagnetic signals respectively received by apertures 14 and 16. These eight beams may be steered in angular directions to cover particular geographic locations and the beam coverage areas may or may not overlap. For example, the four beams associated with four-beam beamformer 60 may be steered to locations as illustrated in FIG. 1. Typically a platform such as satellite 10 may be capable of producing more than eight beams. For example, satellite 10 may be capable of producing thirty-two, forty-eight, or more beams. However, for ease of illustration only eight beams are described, although the number of beamformers and beamformer components is scalable to produce additional beams for transmission and/or reception of electromagnetic signals.

To produce the eight beams, respective conductors 64, 66, 68, 70, 72 and 74 (e.g., conducting traces, RF cables, waveguides, etc.) provide the signals from low noise amplifiers 48-58 to conventional four-beam beamformers 60, 62. In some arrangements, the signals may be adjusted prior to being received at the beamformers. For example, the signals may be mixed to an intermediate frequency (IF) prior to being processed by the beamformers. The signals may also be converted into another portion of the electromagnetic spectrum for processing by the beamformers. For example, the signals from low noise amplifiers 48-58 may be converted into optical signals prior to being provided to beamformers 60 and 62.

Figure 3:
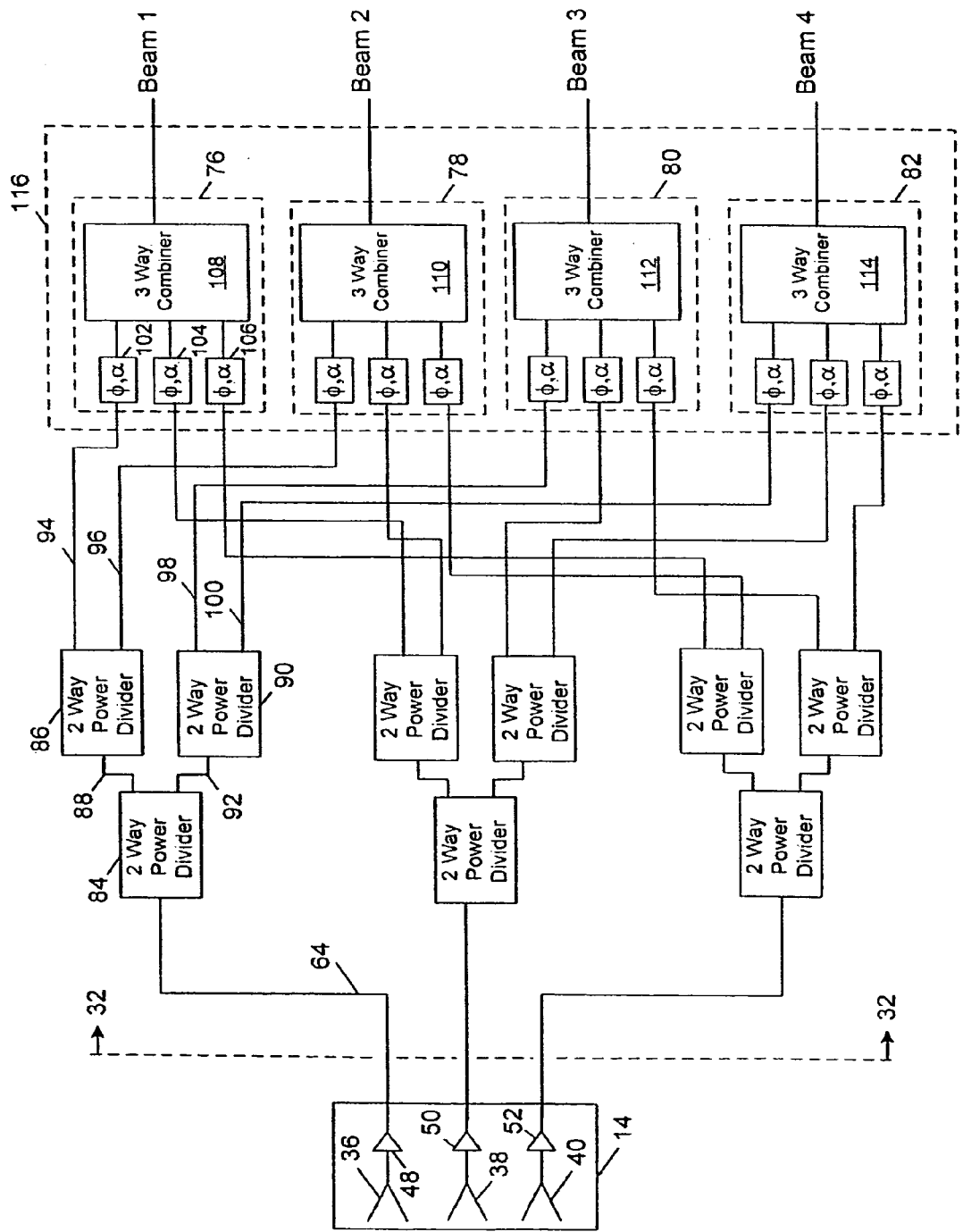
FIG. 3 is a diagrammatic view of one dedicated phased array beamformer for one of the apertures shown in FIG. 2.

Referring also to FIG. 3, a block diagram of four-beam beamformer 60, which is dedicated to aperture 14, is shown. As mentioned above, four beams are produced from signals provided by the antenna elements in aperture 14. Each respective beam is produced by an individual beamformer 76, 78, 80, 82. Since each of the four beamformers 76, 78, 80, 82 have identical components, a description of one beamformer (e.g., beamformer 76) is provided to commonly describe all four of the beamformers. In general, to produce a reception beam, phase shifts (and/or in some situations, attenuations) are respectively applied to the signals received at the phased array antenna elements 36, 38, 40. By adjusting these phase shifts (and/or attenuations) the phase front of the aggregated antenna elements is steered to a particular angular direction.

Using phased array antenna element 36 to demonstrate the processing by four-beam beamformer 60; low noise amplifier 48 provides the received electromagnetic signal conductor 64 to a 2-way power divider 84 that is included in payload module 32. In this embodiment, 2-way power divider 84 splits the received signal and provides the signal to 2-way power divider 86 over conductor 88. The signal is also provided to 2-way power divider 90 over conductor 92. By dividing the signal four-ways, each signal is used to produce the four independent beams in beamformers 76, 78, 80, 82. In other scenarios the signals may be further divided to produce more than four beams (e.g., eight beams, sixteen beams, etc.).

Conductors 94, 96, 98 and 100 respectively provide the four split signals to beamformers 76, 78, 80, and 82. Similarly signals from antenna elements 38 and 40 are split and sent to each of the beamformers. Focusing on beamformer 76, three phase shifters/attenuators 102, 104, 106 receive the signals from antenna elements 36, 38, and 40. In particular phase shifter/attenuator 102 is provided signals from antenna element 36 via conductor 94. Similarly, shifter/attenuator 104 is provided signals from antenna element 38 and shifter/attenuator 106 is provided signals from antenna element 40. Each phase shifter/attenuator 102, 104, 106 applies a phase shift to the respectively received signal. For example, phase shifter/attenuator 102 may apply a 0° phase shift while phase shifter/attenuators 104 and 106 respectively apply phase shifts of 22.5° and 45°. In a similar manner phase shifts may be applied to the signals processed by beamformers 78, 80, and 82 for steering the corresponding beams. In some scenarios, one or more of the phase shifter/attenuators in beamformers 76, 78, 80, and 82 may apply an attenuation or a phase shift and an attenuation to steer and/or shape the beams.

Still focusing on beamformer 76, once the phase shift(s) (and attenuation(s)) is applied, each phase-shifted signal is provided to a three-way combiner 108 included in the beamformer. Combiner 108 produces a beam (i.e., beam 1) by combining the phased shifted signals from each antenna element. For example, three-way combiner 108 may combine signals from antenna elements 36, 38, 40 to produce and steer a beam in a direction based on the relative phase shift of each path. Similarly, three-way combiners 110, 112, 114 in respective beamformers 78, 80, and 82 may receive signals from the each antenna element that have been phase shifted by amounts to produce and steer the other three beams (i.e., beams 2, 3, and 4).

This figure shows the components included in four-beam beamformer 60, which is dedicated to antenna aperture 14. Similarly, antenna apertures 16, 18, and 20 are connected to dedicated beamformers that accordingly divide received signals and apply one or more phase shifts (and/or attenuations). By implementing these dedicated beamformers, a fixed number of beams are allocated to each aperture. In this example, the allocation of the four beams (produced by 3-way combiners 108, 110, 112, and 114) are fixed. Thereby, if phased array antenna aperture 16 is oriented such that it can provide better coverage, beams can not be reallocated from phased array antenna aperture 14 to aperture 16. Furthermore, if aperture 14 is at an angular position that provides no useful coverage, the beams allocated to aperture 14 are wasted. For example, antenna aperture 14 may be facing westward and phased array antenna 16 may be facing eastward while satellite 10 is in low earth orbit. At a particular time of the day, signal traffic may be dominate in the west in comparison to the east. In such a scenario, it may be advantageous to allocate more beams to the westward facing phased array antenna aperture 14 than the eastward facing phased array antenna aperture 16. However, since the beam allocation is fixed, appropriate westward coverage may not be provided and the eastward pointing beams may be underutilized. In other scenarios, rather than orientation, fixed beam allocation may provide inappropriate coverage based on transmit and/or reception beam parameters (e.g., frequency, polarization, etc.).

Additionally, by dedicating a beamformer to underutilized antenna elements (e.g., due to antenna pointing, operating frequency, polarization, etc.), hardware components that are currently of little use occupy valuable real estate on satellite 10. Furthermore, these hardware components add weight to the satellite 10 and increase the cost to produce and operate (e.g., due to power consumption) satellite 10.

Figure 4:
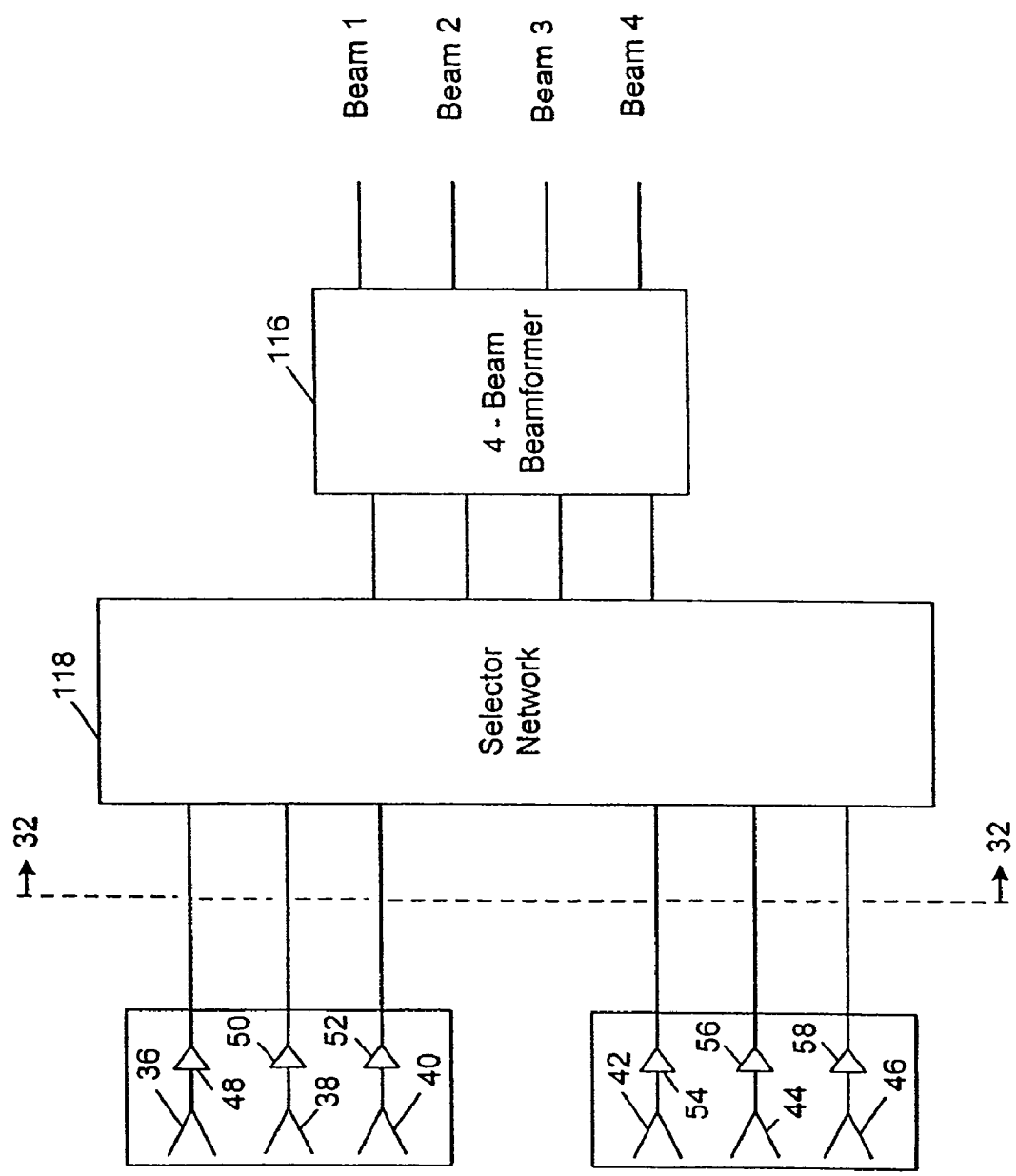
FIG. 4 is a diagrammatic view of a selector network that shares a beamformer to allocate beams between the two apertures included in the phased array antenna system shown in FIG. 1.

Referring to FIG. 4, a portion of payload module 32 is shown to include one four-beam beamformer 116 that is shared among antenna elements of phased array antenna apertures 14 and 16. By sharing beamformer 116, the number of hardware components is reduced, which correspondingly reduces the cost and weight of payload module 32. Furthermore, by sharing beamformer 116 among antenna elements, the pool of beams produced by the beamformer may be flexibly allocated among the phased array antenna apertures depending upon the orientation of satellite 10 (or other type of platform), signal traffic volume, or beam parameter (e.g., frequency, polarization, etc.). Using the example described above, to provide appropriate westward coverage, more beams may be allocated to the westward facing aperture by re-allocating beams currently assigned to the eastward facing aperture. At a later time some or all of the beams may be returned for eastward coverage by re-allocating the beams to the eastward facing phased array antenna aperture.

In this example, apertures 14 and 16 share four-beam beamformer 116, which produces four steerable beams (i.e., Beam 1, Beam 2, Beam 3, Beam 4) that may be allocated among the apertures. Similar to FIG. 2, apertures 14 and 16 respectively include three array elements (i.e., antenna elements 36, 38, 40 and antenna elements 42, 44, 46) for illustrative purposes. Low noise amplifiers 48-58 respectively connect to antenna elements 36-46 and condition received electromagnetic signals.

To share four-beam beamformer 116 between apertures 14 and 16, a selector network 118 selects which signals are provided to the four-beam beamformer. By being capable to select signals from antenna elements 36-40, all four beams may be allocated to provide coverage for aperture 14. At a different time, or when satellite 10 is in a different position, selector network 118 may be configured to beamform signals received by antenna element 42-46 to provide coverage for aperture 16. In still another example, two beams (e.g., beam 1 and beam 2) may be allocated to aperture 14 and the other two beams (e.g., beam 3 and beam 4) may be allocated to aperture 16. Along with providing flexibility to allocate beams among the phased array antenna apertures, beamformer sharing reduces the number of beamformer components in payload module 32. By reducing the number of components, the mass of payload module 32 along with the cost are correspondingly reduced.

Figure 5:
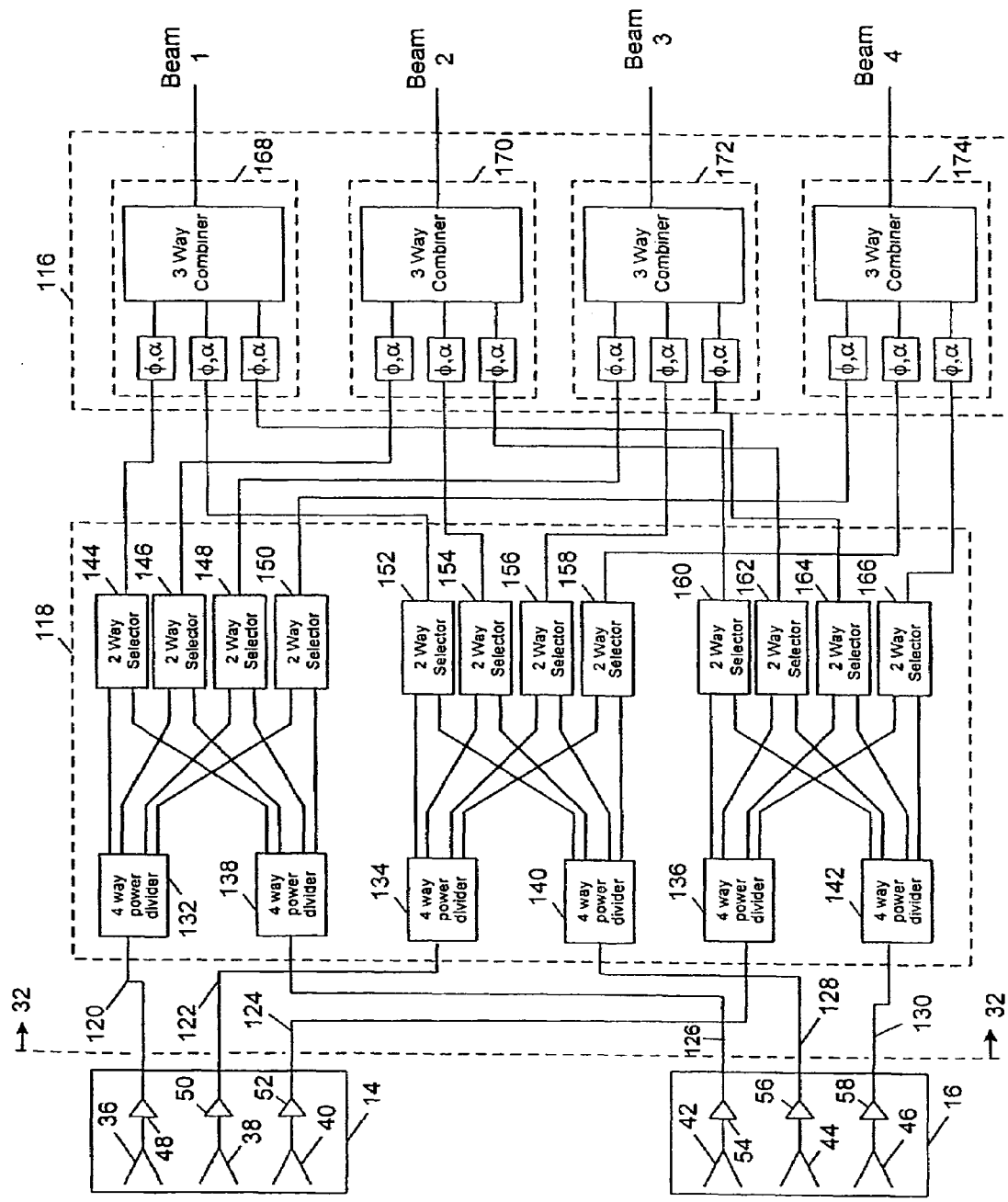
FIG. 5 is a diagrammatic view of a phased array antenna system that produces multiple allocatable beams with less hardware than the phased array antenna system shown in FIG. 3 that includes dedicated beamformers.

Referring to FIG. 5, components included in selector network 118 and four-beam beamformer 116 are shown that allocate beams between aperture 14 and aperture 16. Both apertures 14 and 16 include components (e.g., antenna elements 36-46 and low noise amplifiers 48-58) that are shown in FIG. 4. Conductors 120, 122, 124, 126, 128, 130 connect the low noise amplifiers to selector network 118. In particular, array element 36 is connected to a 4-way power divider 132, array element 38 is connected to a 4-way power divider 134, array element 40 is connected to 4-way power divider 136. Regarding aperture 16, array element 42 is connected to another 4-way power divider 138, array element 44 is connected to 4-way power divider 140, and array element 46 is connected to 4-way power divider 142. Signals from each antenna element are four-way divided so that each signal may be selected for phasing shifting (and/or attenuating) to produce each of the four beams.

Selector network 118 is used to select which antenna elements provide signals to produce the four beams. By selecting from among antenna elements 36, 38, 40, 42, 44, and 46, the four beams may be allocated to either one or more of the phased array antenna apertures 14, 16. For example, all four beams may be allocated to aperture 14 during periods of heavy communication traffic in the area covered by aperture 14. At other times, one, two, three, or four of the beams may be allocated to aperture 16 to increase link capacity for the area covered by phased array antenna 16.

In this example, selector network 118 includes twelve 2-way selectors 144, 146, 148, 150, 152, 154, 156, 158, 160, 162, 164 and 166. By including the 2-way selectors, signals from each of the antenna elements may be selected to produce one or more of the four beams. To produce the four beams, four-beam beamformer 116 includes four single-beam beamformers 168, 170, 172, 174. To select signals from antenna elements, 2-way selectors 144, 146, 148, and 150 are assigned to select between antenna elements 36 and 42. Antenna elements 38 and 44 are assigned to 2-way selectors 152, 154, 156 and 158 while antenna elements 40 and 46 are assigned to 2-way selectors 160, 162, 164, and 166.

By controlling the 2-way selectors, signals received from all or a subset of the antenna elements are beamformed to produce the four beams. Typically, the 2-way selectors connected to a common beamformer are placed in the same position. For example, 2-way selectors 144, 152 and 160 (which are all connected to beamformer 168) are placed in the same position so that signals from the same aperture are provided to beamformer 168. Similarly, 2-way selectors 146, 154, 162 are typically placed in the same position and 2-way selectors 148, 156, 164 are also placed in the same position. Also, 2-way selectors 150, 158, and 166 are typically placed in the same position to beamform signals from the same aperture. For example, 2-way selectors 144-166 may be placed in appropriate positions to beamform signals from antenna elements in aperture 14. By selecting signals from the aperture 14, all four beams are allocated to provide coverage for aperture 14. At a different time, or when satellite 10 is in a different position, 2-way selectors 144-166 may be placed in appropriate positions to beamform signals received by antenna element 42, 44, 46. By selecting signals from these antenna elements in aperture 16, all four beams are now allocated to provide coverage for aperture 16. In still another example, one beam (e.g., beam 1) may be allocated to aperture 14 and the other three beams (e.g., beam 2, 3 and 4) may be allocated to aperture 16.

Similar to beamformers 76, 78, 80, 82 shown in FIG. 3, beamformers 168, 170, 172, and 174 include phase shifter/attenuators that phase shift (and/or attenuate) the signals. After applying a phase shift and/or an attenuation, the signals are provided to corresponding 3-way combiners that are included in each beamformer 168, 170, 172, and 174. By combining the signals from the phase shifter/attenuators, the four 3-way combiners respectively produce beams 1, 2, 3 and 4.

In this arrangement, selector networks 118 includes 2-way selectors to respectively share the beamformers 168-174 among the antenna elements in phased array antenna apertures 14 and 16. However, in other arrangements one or more of the selectors may be a 3-way, 4-way, or N-way selectors (where N is any integer number) to allow for more antenna apertures to share the beamformers. Various techniques may be used to implement the 2-way, 3-way, or N-way selectors. For example, various types of switches may provide the selection function. Along with mechanical switches, other switching techniques know to one skilled in the art of telecommunications and electronics may be incorporated. For example, semiconductor switches, ferrite switches, switches fabricated with micro-electro-mechanical systems (MEMS), digital switches, etc. The selection function may also be provided by one or more processors (e.g., digital signal processors, microprocessors, etc.) that execute appropriate instructions. In this example, the 2-way selectors are used to select from the electromagnetic signals received by antenna elements 36-46. However, besides selecting from the received electromagnetic signals (e.g., RF microwave signals, RF milliwave signals, etc.), the signals collected at the antenna elements may be converted prior to being provided to the selector networks. For example, the signals may be converted into optical signals and provided to optical switches included in the selector networks.

In this example each selector is a single 2-way selector, however in some arrangements one or more of the selectors may be implemented by a network of multiple switches or a network of other types of selector devices. Also, beamformers 168-174 are implemented with discrete components (e.g., phase shift/attenuators, 3-way combiners, etc.). In other arrangements, the discrete components may be integrated into a single package. For example, all of the components included in beamformer 168 may be integrated into a single package (e.g., an optical-electronic integrated package, an RF integrated package, etc.) or other type of integrated assembly. Similarly, selector network 118 or a portion of the selector network may be integrated into a single package.

Along with providing flexibility to allocate beams among the phased array antennas, beamformer sharing reduces the number of components in payload module 32. By comparing the four shared beamformers 168-174 shown in FIG. 5 to the eight dedicated beamformers (four of the eight are shown in FIG. 3), the shared beamformers include less hardware components. By reducing the number of components, the mass of payload module 32 along with the cost are correspondingly reduced.

Figure 6:
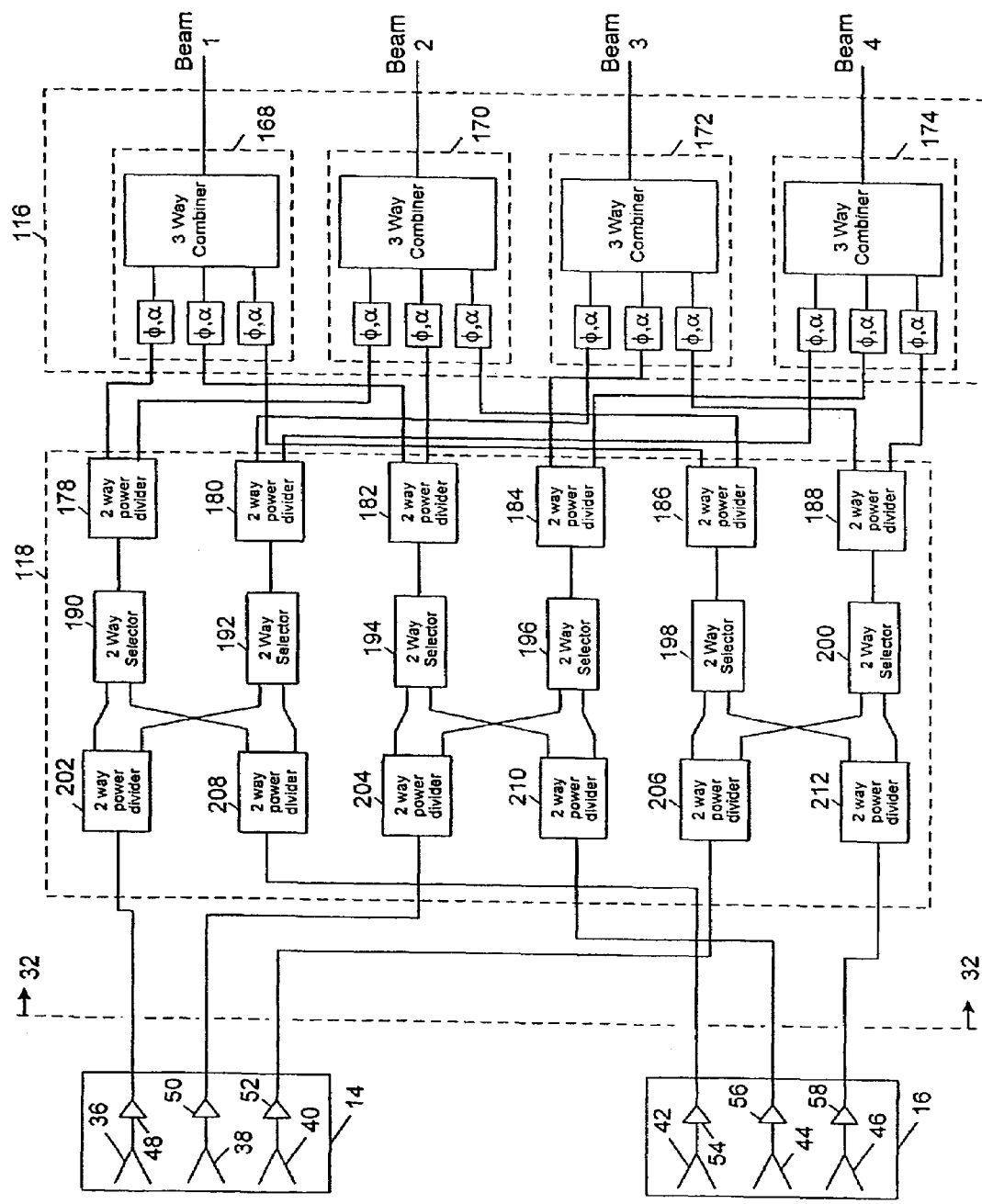
FIG. 6 is a diagrammatic view of another embodiment of a phased array antenna system that shares beamformers to produces multiple beams that are allocated in groups.

Referring to FIG. 6, beamformers may be shared such that the beams allocated to a phased array antenna aperture are constrained to a group size. For example, an aperture may be constrained such that beams are allocated in groups of two. So, using this constraint, e.g., zero, two, or four beams may be allocated to each of the phased array antenna apertures. To provide this grouping constraint, in this example, signal dividers (e.g., power dividers) are included in selector network 118. In particular, a signal divider is respectively inserted between each selector (in selector network 118) and each phase shifter/attenuator (in four-beam beamformer 116).

To constrain phased array antenna aperture 14 and 16 to groups of two beams, payload module 32 includes 2-way power dividers that connect the selector network 118 to the phase shifter/attenuators included the beamformers 168, 170, 172, and 174. In particular, 2-way power dividers 178, 180, 182, 184, 186 and 188 respectively connect 2-way selectors 190, 192, 194, 196, 198, 200 to the phase shift/attenuators included in beamformers 168, 170, 172, and 174. To expand the constraint, by dividing the selected signal N-ways (e.g., 0N, N, 2N, 3N, etc.), each phased array antenna aperture is constrained to groups of N beams.

By including 2-way power dividers 178-188, two two-beam groups are allocated between aperture 14 and aperture 16. For example, say both two-beam groups (for a total of all four beams) are allocated to aperture 14. In this scenario, signals received by antenna elements 36, 38, and 40 are provided (via low noise amplifiers 48, 50, 52) to respective 2-way power dividers 202, 204, and 206. The signals are split by the power dividers and are provided to 2-way selectors 190-200. By placing 2-way selectors 190-200 in appropriate selection positions, the split signals are provided to two 2-way power dividers 178-188 and the corresponding phase shifters/attenuators of beamformers 168, 170, 172 and 174. Thus, two groups of two beams (i.e., beam 1, beam 2, beam 3, and beam 4) are allocated to aperture 14. In a similar manner, by placing 2-way selectors 190-200 in appropriate selection positions, signals received at antenna element 42, 44, and 46 (and sent via low noise amplifiers 54, 56 58 and 2-way power dividers 208, 210, 212) are provided to 2-way power dividers 178-188 and then to the phase shifters/attenuators in beamformers 168, 170, 172, and 174. Once the signals are appropriately phase shifted and optionally attenuated, the signals are provided to the 3-way combiners to produce and allocate all four beams (i.e., beams 1, 2, 3, and 4) to aperture 16.

Selector network 118 shown in FIG. 5 allowed four beams to be individually allocated between phased array antenna apertures 14 and 16. For example, all four beams could be allocated to aperture 14 or to aperture 16. Alternately, one, two, or three beams may be allocated to aperture 14 or aperture 16 (so long as the sum of the allocated beams does not exceed four). In contrast, selector network 118 constrains beam allocation to particular groups of beams. As shown in FIG. 6, network selector 118 includes 2-way power dividers 178-188 to constraint beam allocation to groups of two. For example, four beams (two groups of two beams) may be allocated to aperture 14 or to aperture 16. In another example, one group of two beams (e.g., beams 1 and 2) may be allocated to aperture 14 and another group of two beams (e.g., beams 3 and 4) may be allocated to aperture 16. Selector network 118 may be extended to allocate more individual beams or groups of beams. For example, from a pool of N beams (e.g., sixteen beams, thirty-two beams, forty-eight beams, etc.), a selector network may be implemented such that the N beams are flexibly allocated among phased array antenna apertures. For example, the N beams may be evenly or unevenly distributed among the apertures. During particular time periods more beams may be allocated to a particular aperture to provide needed coverage for increased signal traffic. Along with allocating beams individually, beams may be allocated in groups that may or may not be constrained to one group size. For example, groups of one, two, three, or four beams may be designated for allocation. Furthermore, multiple group sizes may be implemented that may be similar or dissimilar in size. Along with constraining beam groups to a particular number, grouping may also be constrained by one or more other parameters. For example, beams may be grouped by frequency band (e.g., C-band, Ku-band, etc.), polarization (e.g., liner vertical, linear horizontal, right hand circular, left hand circular, elliptical, etc.), or one or more other parameters.

Referring to FIG. 7, a table 214 is shown that compares the approximate number of components included in an antenna system using dedicated beamformers (e.g., beamformers 76, 78, 80, 82 shown in FIG. 3) to the number of components included in an antenna system using shared beamformers (e.g., beamformers 168, 170, 172 and 174 shown in FIG. 5). To compare the number of components, variables are respectively assigned to parameters associated with the components. The letter "L" is defined as the number of phased array antenna apertures and the letter "M" is defined as the number of elements in each phased array antenna aperture. Continuing, the letter "N" is defined as maximum number of beams. "N" can also be considered as the total number of beams in the beam pool. Completing the variables is the letter "P", which defines the number of beams constrained in a group that may be allocated to each phased array antenna aperture.

Column 216 of table 214 presents the number of components used by an antenna system using dedicated beamformers. In particular, a total of L multiplied by M antenna elements (represented as LM) are distributed among the phased array antenna apertures and are each connected to one N/P-way power divider. A total of LMN/P P-way power dividers are also included in the dedicated beamformers along with LMN phase shifter/attenuators. To produce the beams, LN M-way combiners are included in the dedicated beamformers.

Column 218 of table 214 presents the number of components used by an antenna system that includes a selector network for sharing beamformers such as beamformers 168, 170, 172, and 174 shown in FIG. 5 and FIG. 6. The number of total antenna elements (LM) and N/P-way power dividers (LM) used by the antenna system that shares beamformers is equivalent to the number used by the antenna system with dedicated beamformers. However, a number of selectors (e.g., switches) are included in the selector network used to share beamformers. In particular, MN/P L-way selectors are included in antenna system that shares beamformers. By allowing beamformers to be shared, less P-way power dividers, phase shifter/attenuators, and M-way combiners are used by the shared beamformers. In particular, MN/P P-way power dividers, MN phase shifter/attenuators, and N M-way combiners are used to produce and allocate the N beams in an antenna system that shares beamformers.

By including selectors to share beamformers, less components are needed in comparison to an antenna system that uses dedicated beamformers. These component savings are presented in column 220 of table 214. For example, by implementing beamformer sharing, the number of P-way power dividers, phase shifter/attenuators, and M-way combiners are reduced. As shown in column 220, the number of P-way power dividers is reduced by (L−1)MN/P, the number of phase shifter/attenuators is reduced by (L−1)MN, and the number of M-way combiners is reduced by (L−1)N. By reducing the components in the shared beamformers, payload space and mass is conserved along with reducing cost. Column 222 of Table 214 presents the number of components added by implementing a shared beamformer scheme as opposed to a dedicated beamformer scheme. In particular, MN/P selectors are added by sharing beamformers. However, these additional selectors are less in number than the components eliminated, as shown in column 220.

While the above-described system discloses selecting signals received at one or more phased array antenna elements, other operational configurations are possible. For example, signals may be selected for transmission over one or more phased array antenna elements. In such a configuration, the shared beamformers are designed for transmission. Combiners (e.g., 3-way signal combiner 168) are replaced with signal dividers that provide signals to the selector network(s) for directing the signals to allocated phased array antenna elements. Additionally, the low noise amplifiers (e.g., low noise amplifier 48) are replaced with power amplifiers to drive the phased array antenna elements. Additionally components may be also be added to provide signal transmission. Furthermore, in some configurations, shared beamformers may provide both signal transmission and reception capabilities.

In other operational configurations, both shared and dedicated beamformers may be implemented into a phased array antenna system. Beamformer sharing may also depend upon a signal parameter. In one configuration, beams may be shared based on signal frequency or polarization. For example, eight beams may be shared among apertures that transmit or receive Ka-band signals while only four beams are shared among apertures that transmit or receive Ku-band signals. Various types of antenna elements may be implemented in the antenna systems that included a selector network to share beams. For example, multi-beam phased arrays, multi-beam reflector arrays, or other types of antenna elements or apertures that are well known to one skilled in the art or antenna and antenna system design may be implemented. By implementing a shared beamformer, beams may be shared among different size arrays. For example, beams may be shared between one aperture that includes a large number of antenna elements and another aperture that includes relatively fewer antenna elements. In still another implementation, a shared beamformer may be implemented to share beams among antenna elements or groups of antenna elements that are all included in the same phased array antenna aperture.

A number of implementations have been described. Nevertheless, it will be understood that various modifications may be made. Accordingly, other implementations are within the scope of the following claims.

What is claimed is:

1. A phased array antenna system, comprising:
    a first and second phased array antenna element, wherein each phased array antenna element is configured to transmit electromagnetic energy; and
    a selector configured to provide an electromagnetic signal from a signal divider to the first phased array antenna element or the second phased array antenna element.

2. The phased array antenna system of claim 1, wherein the first and second phased array antenna elements are located on separate phased array antennas.

3. The phased array antenna system of claim 1, further comprising:
    a phase shifter configured to adjust the phase of the electromagnetic signal provided to the selector from the signal divider.

4. The phased array system of claim 1, wherein the selector includes a switch.

* * * * *